(12) United States Patent
Liu et al.

(10) Patent No.: US 9,111,367 B2
(45) Date of Patent: Aug. 18, 2015

(54) NONLOCALITY BASED SUPER RESOLUTION RECONSTRUCTION METHOD AND DEVICE

(71) Applicants: Peking University, Beijing (CN); Peking University Founder Group Co., Ltd., Beijing (CN); Beijing Founder Electronics Co., Ltd., Beijing (CN)

(72) Inventors: Jiaying Liu, Beijing (CN); Yue Zhou, Beijing (CN); Jie Ren, Beijing (CN); Zongming Guo, Beijing (CN)

(73) Assignees: Peking University, Beijing (CN); Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 14/129,764
(22) PCT Filed: Dec. 13, 2012
(86) PCT No.: PCT/CN2012/086570
§ 371 (c)(1),
(2) Date: Dec. 27, 2013
(87) PCT Pub. No.: WO2013/087003
PCT Pub. Date: Jun. 20, 2013

(65) Prior Publication Data
US 2014/0133780 A1 May 15, 2014

(30) Foreign Application Priority Data
Dec. 14, 2011 (CN) .......................... 2011 1 0418317

(51) Int. Cl.
*G06K 9/36* (2006.01)
*G06T 3/40* (2006.01)
*H04N 19/51* (2014.01)
*H04N 19/59* (2014.01)

(52) U.S. Cl.
CPC .............. *G06T 3/4053* (2013.01); *H04N 19/51* (2014.11); *H04N 19/59* (2014.11)

(58) Field of Classification Search
USPC .......... 382/284, 293, 294, 299, 300, 254, 107
See application file for complete search history.

(56) References Cited

U.S. PATENT DOCUMENTS 7,260,277 B2 *  8/2007  Messina et al. ................ 382/299
7,957,610 B2 *  6/2011  Toma et al. .................... 382/299
(Continued)

FOREIGN PATENT DOCUMENTS

CN    101917624 A    12/2010
CN    102142137 A     8/2011

OTHER PUBLICATIONS

Zhuo, Y. Nonlocal Based Super Resolution with Rotation Invariance and Search Window Relocation, ICASSP 2012, Mar. 25-20, 2012, pp. 853-856.

(Continued)

*Primary Examiner* — Yon Couso
(74) *Attorney, Agent, or Firm* — Lathrop & Gage LLP

(57) ABSTRACT

The present invention relates to the field of digital image enhancement technologies, and more particularly to a non-locality-based super-resolution reconstruction method and device, so as to solve the problem of relatively low resolution of an image after non-locality-based super-resolution reconstruction in the prior art. The method in the embodiment of the present invention comprises: determining a position of a search window where a current macro-block is mapped in each of other image frames; determining a search window where the current pixel block is mapped in the each of the image frames, according to the position of the search window where the macro-block, where the pixel corresponding to the current pixel block is located, is mapped in the each of the image frames, and determining a similarity value of each determined pixel block in the determined search window relative to the current pixel block respectively; and determining an optimized central pixel value of each pixel block according to the determined similarity value. By use of the embodiments of the present invention, the resolution of an image subjected to non-locality-based super-resolution reconstruction is enhanced.

20 Claims, 2 Drawing Sheets

(56) References Cited

U.S. PATENT DOCUMENTS

| | | | |
|---|---|---|---|
| 8,036,495 B2 * | 10/2011 | Takeshima et al. | 382/299 |
| 2005/0041842 A1 * | 2/2005 | Frakes et al. | 382/128 |
| 2010/0272184 A1 * | 10/2010 | Fishbain et al. | 375/240.16 |

OTHER PUBLICATIONS

PCT/CN2012/086570 International Search Report with English Translation, Mar. 21, 2013, 6 pages.

* cited by examiner

NONLOCALITY BASED SUPER RESOLUTION RECONSTRUCTION METHOD AND DEVICE

TECHNICAL FIELD

The present invention relates to a digital image enhancement technology, and in particular, to a non-locality-based super-resolution reconstruction method and a non-locality-based super-resolution reconstruction device.

BACKGROUND

Multi-frame super resolution reconstruction technology is used to fuse a set of observed low resolution images into one high resolution image. Due to sub-pixel shifts, each observed low resolution image contains complementary information. With knowledge of the shifts, these low resolution images can be combined to remove the aliasing and generate a higher resolution image.

In conventional multi-frame algorithms, it is essential to know the shift of the sub-pixels between low resolution images. Thus, accurate motion estimation plays a critical role in conventional multi-frame fusion. But unavoidable motion estimation errors lead to disturbing artifacts. To avoid motion estimation, a super resolution algorithm free of the motion estimation is proposed, which averages neighbors by measuring similarity to reconstruct the center pixel. But the algorithm only takes translation into account. Since complex motions are usually contained in video, and even rotation exists in textures in one frame, the number of potential similar blocks that could be found by the algorithm will be reduced. Based on the non-local super resolution reconstruction or non-local denoising algorithm, two improvements are proposed: adaptive parameters selection and invariance-based similarity measure.

Adaptive parameters selection is to discuss the relationship among block sizes, search window sizes and performances of non-local means, and then to adaptively select these parameters. However, the mobile window search strategy in this algorithm is pixel-wise and is likely to be trapped into local minimum, thereby reducing the resolution of reconstructed image.

In summary, the resolution of an image after non-locality-based super resolution reconstruction is low in the state-of-art.

SUMMARY

A non-locality-based super-resolution reconstruction method and a non-locality-based super-resolution reconstruction device are provided to solve the problem of relatively low resolution of an image after non-locality-based super-resolution reconstruction in the prior art according to embodiments of the present application.

A non-locality-based super-resolution reconstruction method according to an embodiment of the present application is provided, which comprises:

performing an interpolation on a plurality of image frames to be reconstructed, and dividing each of the image frames into a plurality of macroblock with a same size;

determining, for each macro-block in each of the image frames, a position of a search window where a current macro-block is mapped in each of other image frames;

determining a pixel block corresponding to each pixel in a circle formed by taking the each pixel on each of the image frames as a center of the circle, and a predetermined distance as a radius of the circle;

performing, in each of the image frames, following operations on each determined pixel block therein: determining a search window where the current pixel block is mapped in the each of the image frames, according to the position of the search window where the macro-block, where the pixel corresponding to the current pixel block is located, is mapped in each of the image frames, and determining a similarity value of each determined pixel block in the determined search window relative to the current pixel block respectively; and determining an optimized central pixel value of each pixel block according to the determined similarity value.

Preferably, the step of determining a position of a search window where a current macro-block is mapped in each of other image frames further comprises:

determining a motion vector from the current macro-block to each of other image frames respectively; and with respect to an image frame, using the determined motion vector as the motion vector of the search window where the current macro-block is mapped in the image frame, and re-locating the position of the search window.

Preferably, the step of determining a similarity value further comprises:

determining a local structure descriptor and a local luminance descriptor of the each pixel block in the current pixel block and the search window;

determining a normalized total similarity value based on the determined local structure descriptor and the determined local luminance descriptor; and determining the similarity value between the current pixel block and the each pixel block in the search window based on the determined local structure descriptor and the determined local luminance descriptor and the normalized total similarity value respectively.

Preferably, the step of determining an optimized central pixel value further comprises:

using, for any pixel block, the similarity value between the current pixel block and each pixel block as a weight, and determining a weighted average of central pixel values in the each pixel block to obtain an optimized central pixel value of the current pixel block.

A non-locality-based super-resolution reconstruction device according to an embodiment of the present application is provided, which comprises a first processing module, a position determining module, a second processing module, a similarity determining module and a pixel value determining module.

The first processing module is configured to perform an interpolation on a plurality of image frames to be reconstructed, and divide each of the image frames into a plurality of macroblock with a same size.

The position determining module is configured to determine, for each macro-block in each of the image frames, a position of a search window where a current macro-block is mapped in each of other image frames The second processing module is configured to determine a pixel block corresponding to each pixel in a circle formed by taking the each pixel on the each of the image frames as a center of the circle and a predetermined distance as a radius of the circle.

The similarity determining module is configured to perform, in the each of the image frames, following operations on each determined pixel block therein: determining a search window where the current pixel block is mapped in the each of the image frames, according to the position of the search window where the macro-block, where the pixel corresponding to the current pixel block is located, is mapped in the each of the image frames, and determining a similarity value of each determined pixel block in the determined search window relative to the current pixel block respectively.

The pixel value determining module configured to determine an optimized central pixel value of each pixel block according to the determined similarity value.

Preferably, the position determining module is further configured to determine a motion vector from the current macro-block to each of the other image frames respectively;

with respect to an image frame, use the determined motion vector as the motion vector of the search widow where the current macro-block is mapped in the image frame, and then re-locate the position of the search window.

Preferably, the similarity determining module is further configured to: determine a local structure descriptor and a local luminance descriptor of the each pixel block in the current pixel block and the search window; determine a normalized total similarity value based on the determined local structure descriptor and the determined local luminance descriptor; and determine the similarity value between the current pixel block and the each pixel block in the search window based on the determined local structure descriptor and the determined local luminance descriptor and the normalized total similarity value respectively.

Preferably, the pixel value determining module is further configured to: use, for any pixel block, the similarity value between the current pixel block and the each pixel block as a weight, and determine a weighted average of central pixel values in the each pixel block to obtain an optimized central pixel value of the current pixel block.

By determining the search window of the current pixel block in each of the image frames, and determining the similarity value of each pixel block in the search window relative to the current pixel block according to the position of the search window where the macro-block, where the pixel corresponding to a current pixel block is located, is mapped in each of the image frames, the resolution of the non-locality-based super-resolution reconstructed image is increased, and block artifacts due to the nonlocal based super resolution algorithm are further eliminated.

DETAILED DESCRIPTION

In the embodiment of the present application, a position of a search window where a current macro-block is mapped in each of other image frames is determined. By taking each pixel on each of the image frames as the center of a circle and a predetermined distance as the radius of the circle, it determines a pixel block corresponding to each pixel. According to the position of the search window where the macro-block, where a pixel corresponding to a current pixel block is located, is mapped in each of the image frames, it determines a search window of the current pixel block in each of the image frames, and then determines a similarity value of each determined pixel block in the determined search window relative to the current pixel block. According to the similarity value of each pixel block, an optimized central pixel value of each pixel block is determined. The resolution of an image subjected to non-locality-based super-resolution reconstruction is enhanced by performing the above mentioned processes.

Embodiments will be described in detail hereinafter with reference to the accompanying drawings.

Figure 1:
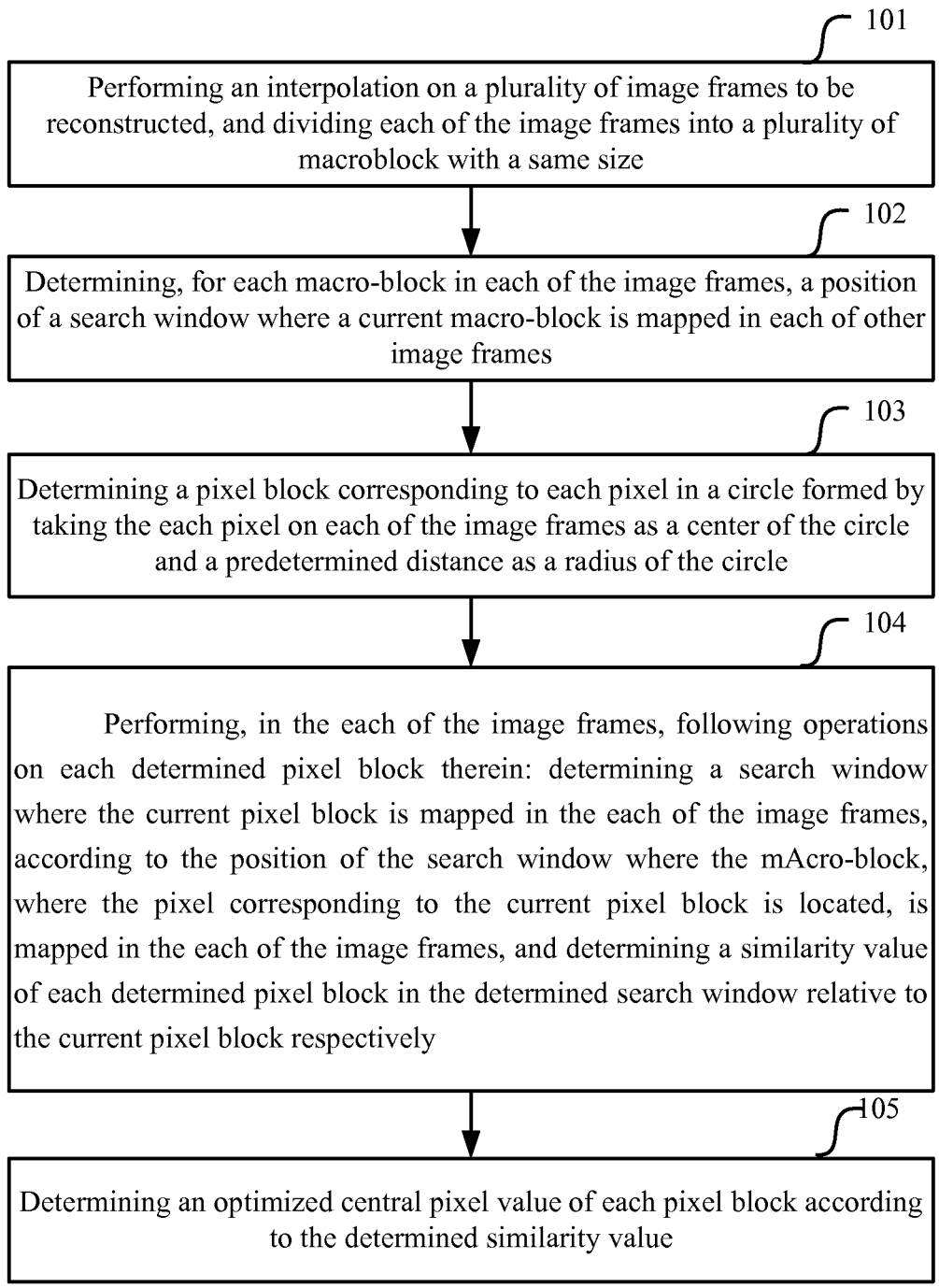
FIG. 1 is a schematic flow chart of a non-locality-based super-resolution reconstruction method according to an embodiment of the present application.

As shown in FIG. 1, a non-locality-based super-resolution reconstruction method according to an embodiment of the present application comprises:

a step 101 of performing an interpolation on a plurality of image frames to be reconstructed, and dividing each of the image frames into a plurality of macroblock with a same size;

a step 102 of determining, for each macro-block in each of the image frames, a position of a search window where a current macro-block is mapped in each other image frames;

a step 103 of determining a pixel block corresponding to each pixel in a circle formed by taking the each pixel on the each of the image frames as a center of the circle and a predetermined distance as a radius of the circle;

a step 104 of performing, in the each of the image frames, following operations on each determined pixel block therein:

determining a search window where the current pixel block is mapped in the each of the image frames, according to the position of the search window where the macro-block, where the pixel corresponding to the current pixel block is located, is mapped in the each of the image frames, and determining a similarity value of each determined pixel block in the determined search window relative to the current pixel block respectively;

a step 105 of determining an optimized central pixel value of each pixel block according to the determined similarity value.

It is preferable, in step 101, to perform an interpolation on a plurality of image frames to be reconstructed to desired high resolution by spatial interpolation methods. For example, if the low resolution of an image to be reconstructed is 640×320 and the desired resolution is 800×600, the image of the low resolution of 640×320 is interpolated to be of the resolution of 800×600 by spatial interpolation methods.

And each of the image frames is divided into a plurality of macroblock with a same size, for example 16×16 macroblock. Particularly, the number of divided macroblock could be set as required or according to experiences.

Then the position of the search widow where each macro-block is mapped in each of other image frames is determined. In operation, each macro-block is treated in the same way. In the following, one macro-block is exemplified, and the macro-block under operations is referred to as the current macro-block so as to differ from other macroblock.

Preferably, in step 102, the position of the search window where the current macro-block is mapped in each of other image frames is re-determined by adopting a search based on macroblock.

To be specific, a motion vector from the current macro-block to each of other image frames is determined respectively.

With respect to an image frame, the determined motion vector is used as a motion vector of the search window where the current macro-block is mapped in the image frame, and the position of the search window is re-located.

In operation, the motion vector from the current macro-block to each of the other image frames is determined in accordance with the following formula 1 or formula 2:

$$A_1 = \sum_{i=m+1}^{n} A_i (n > m); \quad (1)$$

$$A_2 = \sum_{j=x}^{m-1} A_j (x < m), \quad (2)$$

where the current macro-block is in m-th image frame; $A_1$ is the motion vector from the current macro-block to n-th image frame; $A_i$ is the motion vector from the macro-block in (i−1)-th image frame corresponding to the current macro-block to i-th image frame; $A_2$ is the motion vector from the current macro-block to the x-th image frame; and $A_j$ is the motion vector from the macro-block in (j+1)-th image frame corresponding to the current macro-block to j-th image frame.

The motion vector from the current macro-block to each of the image frames after the image frame, where the current macro-block is located, is determined in accordance with formula 1; the motion vector from the current macro-block to each of the image frames before the image frame, where the current macro-block is located, is determined in accordance with formula 2.

Preferably, in step 102, $A_i$ is determined according to the following steps:

determining an initial predicted vector of a macro-block in the (i−1)-th image frame corresponding to the current macro-block, and performing adaptive rood mode search to obtain $A_i$ in accordance with the determined initial predicted vector.

Preferably, in step 102, if the (i−1)-th image frame is an image where the current macro-block is located and the current macro-block is located at the leftmost, the initial predicted vector of the corresponding macro-block is zero;

if the (i−1)-th image frame is an image where the current macro-block is located and the current macro-block is not located at the leftmost, a motion vector of a left adjacent macro-block is used as the initial predicted vector of the corresponding macro-block; and if the (i−1)-th image frame is not an image where the current macro-block is located, a motion vector of the macro-block in a previous image frame is used as the initial predicted vector of the corresponding macro-block.

Preferably, in step 102, $A_j$ is determined according to the following steps:

determining an initial predicted vector of the current macro-block in the (j+1)-th image frame corresponding to the current macro-block, and performing adaptive rood mode search to obtain $A_j$ in accordance with the determined initial predicted vector.

Preferably, in step 102, if the (j+1)-th image frame is an image where the current macro-block is located and the current macro-block is located at the leftmost, the initial predicted vector of the corresponding macro-block is zero;

if the (j+1)-th image frame is an image where the current macro-block is located and the current macro-block is not located at the leftmost, a motion vector of a left adjacent macro-block is used as the initial predicted vector of the corresponding macro-block; and if the (j+1)-th image frame is not an image where the current macro-block is located, a motion vector of the macro-block in the subsequent image frame is used as the initial predicted vector of the corresponding macro-block.

Hereinafter, the method of calculating the motion vector according to the present application is exemplified in detail by calculating the motion vector from the current macroblcok (x, y) to the t-th frame (assuming $t > t_0$).

The initial predicted vector is defined as $(d_x, d_y)$. If the current macro-block (x, y) is in the leftmost column of macro-block, the initial value of $(d_x, d_y)$ is zero; and if not, the motion vector of a left macro-block (in the same line as the current macro-block) adjacent to the current macro-block (x, y) is used as the initial value of (dx, dy).

The motion vector from the current macro-block (x, y) to the (t0+1)-th frame is obtained by performing adaptive rood mode search on the current macro-block (x, y) in the t0-th frame with (dx, dy) being used as the initial predicted vector; then the followings are performed: searching for macro-block A corresponding to the current macro-block (x, y) in the (t0+1)-th frame, i.e. the macro-block in the (t0+1)-th frame on the position of the sum of the position of the current macro-block and the motion vector from the current macro-block (x, y) to the (t0+1)-th frame; assigning the motion vector of the current macro-block to (dx, dy) as the initial predicted vector of macro-block A; performing adaptive rood pattern search to obtain the motion vector from the macro-block A to the (t0+2)-th frame. Then, the followings are performed: searching for macro-block B in the (t0+1)-th frame corresponding to the macro-block A, i.e. the macro-block in the (t0+2)-th frame on the position of the sum of the position of the macro-block A and the motion vector from the macro-block A to the (t0+2)-th frame; assigning the motion vector of the macro-block A to $(d_x, d_y)$ as the initial predicted vector of macro-block B; performing adaptive rood pattern search to obtain the motion vector from the macro-block B to the (t0+3)-th frame, and so on until the motion vector from the macro-block in (t−1)-th frame corresponding to the current macro-block (x, y) to the t-th frame is obtained. Finally, the motion vector from the current macro-block (x, y) from the $t_0$-th frame to the t-th frame is obtained by summing all the motion vectors. The above-described are explanations to formula 1.

The description of embodiment with $t < t_0$ will be omitted, since it will be treated in a similar way as the embodiment with $t > t_0$.

Preferably, in step 103, with respect to each pixel to be used for re-constructing frames, a plurality of pixel blocks are obtained by taking each pixel as a center of a circle and a predetermined distance as a radius of the circle, wherein each pixel block only corresponds to one pixel, and the center of circle in each pixel block is the pixel corresponding to the pixel block.

After the pixel block corresponding to every pixel is determined, a rotation invariance measure is performed on each pixel block in each of the image frames to determine the similarity between each pixel block and each of the other pixel blocks in the search window of each of the image frames.

The size of the search window and the length of the radius could be set as required or according to experiences. For example, the length of the radius could be 6 pixels, and the size of the search widow could be 27×27 pixels.

Preferably, in an embodiment of the present application, each pixel block is described by local structure and local luminance, thereby the similarity between each pixel block and each of the other pixel blocks could be described by local structure and local luminance.

In operation, each macro-block is treated in a same way. In the following, one macro-block is exemplified, and the macro-block under operations is referred to as the current macro-block so as to differ from other macroblock.

In detail, in step 104, the following is performed:
determining a local structure descriptor and a local luminance descriptor of each pixel block in the current pixel block and the search window;
determining a normalized total similarity value based on the determined local structure descriptor and the determined local luminance descriptor; and
determining the similarity value between the current pixel block and each pixel block in the search window based on the determined local structure descriptor and the determined local luminance descriptor and the normalized total similarity value respectively,
wherein each pixel block in the search window could be determined by re-locating the position of the search window by taking the motion vector from the macro-block where the pixel block is located to each of the image frames as the motion vector of the search window.

In an embodiment of the present application, the local structure could be described by SIFT (Scale-invariant feature transform) operator; and local luminance could be determined as follow:

$$I_t(k, l, r) = \underset{(i,j)\,s.t.\,|i-k|+|j-l|=t}{\text{mean}} Y(i, j) \quad (3)$$

where $Y(i, j)$ is the pixel value at $(i, j)$; $I_t(k, l, r)$ is the local luminance value, which represents the $(t+1)$-th component denoting the mean of pixel luminances of all the pixels that have the same Manhattan distance t from the center pixel $(k, l)$; mean represents computering the mean; s.t. means subject to; and i, j, k, l have the same meanings as that in the above formulas.

Preferably, in step 104, the similarity value between the current pixel block and each pixel block in the search window could be defined by Gaussian function of structure distance and luminance distance.

Correspondingly, in step 104, the normalized total similarity value could be defined as follow:

$$C(k, l) = \sum_{i,j \in N(k,l)} \exp \left\{ -\frac{\|P(i, j, r) - P(k, l, r)\|_2^2}{\sigma_1^2} \right\} \times \exp \left\{ -\frac{\|I(i, j, r) - I(k, l, r)\|_2^2}{\sigma_2^2} \right\} \quad (4)$$

Correspondingly, in step 104, the similarity could be defined as follow:

$$W(k, l, i, j) = \frac{1}{C(k, l)} \times \exp \left\{ -\frac{\|P(i, j, r) - P(k, l, r)\|_2^2}{\sigma_1^2} \right\} \times \exp \left\{ -\frac{\|I(i, j, r) - I(k, l, r)\|_2^2}{\sigma_2^2} \right\} \quad (5)$$

where $C(k, l)$ is the normalized total similarity value; $W(k, l, i, j)$ is the similarity value between the pixel block corresponding to the pixel $(k, l)$ and the pixel block corresponding to the pixel $(i, j)$; k is the x-coordinate of the pixel corresponding to the current pixel block; l is the y-coordinate of the pixel corresponding to the current pixel block; j is the y-coordinate of the pixel corresponding to another pixel block; r is the radius; $P(k, l, r)$ is the local structure descriptor of the current pixel block; $I(i, j, r)$ is the local luminance descriptor of another pixel block; $I(k, l, r)$ is the local luminance descriptor of the current pixel block; $\sigma_1$ is the corresponding weight of the local structure descriptor and $\sigma_2$ is the corresponding weight of the local luminance descriptor; $N(k, l)$ is a neighborhood of $(k, l)$, the neighborhood comprises all the search windows in every frame corresponding to $(k, l)$.

In order to adaptively balancing the weights of local structure and of local luminance in similarity calculation, a preferred approach is to fix $\sigma_2$ and make $\sigma_1$ adaptively change according to the nearest distance between the current pixel block and each pixel block in the search window.

In detail, the corresponding weight of the local structure descriptor is defined as follow:

$$\sigma_1 = \sigma_0 + \text{step} \times \left[ \frac{\underset{i,j \in N(k,l)}{\min} \{\|P(i, j, r) - P(k, l, r)\|_2^2\}}{L} \right] \quad (6)$$

where $\sigma_0$ is the initial value of $\sigma_1$ and could be set according to experiences; L is the length of piecewise function.

Preferably, in step 105, with respect to a pixel block, the similarity value between the current pixel block and each pixel block is used as a weight, and then a weighted average of central pixel values in each pixel block is determined to obtain an optimized central pixel value of the current pixel block.

After the optimized central pixel value of the current pixel block is determined, the non-locality-based super-resolution reconstruction method is realized.

In embodiments of the present application, continuity of motion in time and space is considered in re-locating the search window, thereby effectively reducing the risk of macro-block-based search being trapped into local minimum. In measuring the similarity of blocks, the SIFT operator is adopted to describe the local structure and adaptive parameter choosing is used to balance the weights of local structure and the local luminance in similarity calculating, thereby further improving the accuracy of similarity calculation.

It is noted that more details is recovered and the block artifacts of nonlocal super resolution algorithm is eliminated according to the present application by comparison of the embodiment of the present application and bicubic interpolation and nonlocal super resolution algorithm. In a PSNR comparison of one image shifted to a same resolution, the result of the embodiment of the present application is 28.61 dB, the result of bicubic interpolation is 28.45 dB, and the result of nonlocal super resolution algorithm is 27.81 dB. The above result shows that the reconstructed result is nearest to the original image.

It is provided a non-locality-based super-resolution reconstruction device according to embodiments of the present application. Since the principle of the device is similar to the non-locality-based super-resolution reconstruction method, the implement of the device could refer to the implement of the method and the repeated description is omitted accordingly.

Figure 2:
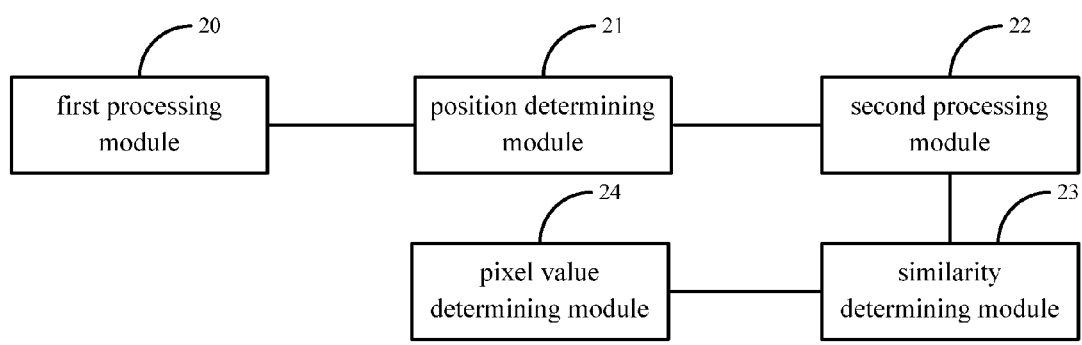
FIG. 2 is a schematic structure diagram of a non-locality-based super-resolution reconstruction device according to an embodiment of the present application.

As shown in FIG. 2, the non-locality-based super-resolution reconstruction device according to an embodiment of the present application includes: a first processing module 20, a position determining module 21, a second processing module 22, a similarity determining module 23 and a pixel value determining module 24.

The first processing module 20 is configured to perform an interpolation on a plurality of image frames to be reconstructed, and divide each of the image frames into a plurality of macroblock with a same size.

The position determining module 21 is configured to determine, for each macro-block in the each of the image frames, a position of a search window where the current macro-block is mapped in each of other image frames.

The second processing module 22 is configured to determine a pixel block corresponding to each pixel in a circle formed by taking the each pixel on the each of the image frames as a center of the circle and a predetermined distance as a radius of the circle.

The similarity determining module 23 is configured to perform, in the each of the image frames, following operations on each determined pixel block therein: determining a search window where the current pixel block is mapped in the each of the image frames, according to the position of the search window where the macro-block, where the pixel corresponding to the current pixel block is located, is mapped in the each of the image frames, and determining a similarity value of each determined pixel block in the determined search window relative to the current pixel block respectively.

The pixel value determining module 24 is configured to determine an optimized central pixel value of each pixel block according to the similarity value of each pixel block.

Preferably, the position determining module 21 may be configured to determine a motion vector from the current macro-block to the each of the other image frames respectively;
    with respect to an image frame, use the determined motion vector as the motion vector of the search widow where the current macro-block is mapped in the image frame, and then re-locating the position of the search window.

Preferably, the position determining module 21 may be configured to determine the motion vector from the current macro-block to each of other image frames in accordance with the formula 1 or formula 2.

Preferably, the position determining module 21 is configured to determine an initial predicted vector of the macro-block in the (i−1)-th image frame corresponding to the current macro-block and perform adaptive rood mode search to obtain $A_i$ in accordance with the determined initial predicted vector; and determine an initial predicted vector of the macro-block in the (j+1)-th image frame corresponding to the current macro-block and perform adaptive rood mode search to obtain $A_j$ in accordance with the determined initial predicted vector.

Preferably, if the (i−1)-th image frame is an image where the current macro-block is located and the current macro-block is located at the leftmost, the position determining module 21 may set the initial predicted vector of the macro-block to be zero;
    if the (i−1)-th image frame is an image where the current macro-block is located and the current macro-block is not located at the leftmost, the position determining module 21 may set a motion vector of a left adjacent macro-block to be used as the initial predicted vector of the macro-block; and
    if the (i−1)-th image frame is not an image where the current macro-block is located, the position determining module 21 may set a motion vector of the macro-block in the previous image to be used as the initial predicted vector of the macro-block;
    if the (j+1)-th image frame is an image where the current macro-block is located and the current macro-block is located at the leftmost, the position determining module 21 may set the initial predicted vector of the macro-block to be zero;
    if the (j+1)-th image frame is an image where the current macro-block is located and the current macro-block is not located at the leftmost, the position determining module 21 may set a motion vector of a left adjacent macro-block to be used as the initial predicted vector of the macro-block; and
    if the (j+1)-th image frame is not an image where the current macro-block is located, the position determining module 21 may set a motion vector of the macro-block in the subsequent image to be used as the initial predicted vector of the macro-block.

Preferably, the similarity determining module 23 may be configured to respectively determine a local structure descriptor and a local luminance descriptor of each pixel block in the current pixel block and the search window; determine a normalized total similarity value based on the determined local structure descriptor and the determined local luminance descriptor; respectively determine a similarity value between the current pixel block and each pixel block in the search window based on the determined local structure descriptor and the determined local luminance descriptor and the normalized total similarity value.

Preferably, the similarity determining module 23 may be configured to determine the normalized total similarity value in accordance with formula 4.

Preferably, the similarity determining module 23 may be configured to determine the similarity in accordance with formula 5.

Preferably, the similarity determining module 23 may be configured to determine the corresponding weight of the determined local structure descriptor in accordance with formula 6.

Preferably, with respect to one pixel block, the pixel value determining module 24 may be configured to use the similarity value between the current pixel block and each pixel block as a weight, and then determine a weighted average of central pixel values in each pixel block to obtain an optimized central pixel value of the current pixel block.

It should be understood by those skilled in the art that embodiments of the present application could be provided as a method, a system or a computer program product. Therefore, the present application could be implemented as an example in the form of hardware, software or combination thereof. Also, the present application could take the form of a computer program product implemented on one or more computer-readable storage mediums (including but not limited to magnetic disk memory, CD-ROM, optical memory and so on) which contain computer-readable program codes therein.

The present application is described with reference to the flow char and/or block diagram of the method, device (system), and computer program product. It should be understood that each step and/or block in the flow char and/or block diagram, and a combination of steps and/or blocks in the flow char and/or block diagram could be realized by computer program instructions. These computer program instructions may be provided to a general purpose computer, a dedicated computer, a embedded processor or a processor of other programmable data processing devices to generate a machine so that the instructions performed by the computer or the processor of other programmable data processing devices generate means used to realize the functions designated in one or more steps in the flow chart and/or one or more blocks in the block diagram.

These computer program instructions may also be stored in a computer-readable memory which may guide the computer or other programmable data processing devices to operate in a particular way so that the instructions stored in the computer-readable memory generate product comprising instruction means which may realize the functions designated in one or more steps in the flow chart and/or one or more blocks in the block diagram.

These computer program instructions may also be loaded onto the computer or other programmable data processing devices so that a series of operation steps are performed on the computer or other programmable data processing device to generate treatments realized by the computer, and thus the instructions performed on the computer or other programmable data processing devices could provide steps for realizing the functions designated in one or more steps in the flow chart and/or one or more blocks in the block diagram.

The disclosed and other embodiments and the functional operation described in the present specification could be implemented by a digital circuit or a computer software, firmware or hardware comprising the disclosed structure in the present specification and its equivalent, or by one or more combination thereof. The disclosed and other embodiments could be implemented as one or more computer program products, i.e. one or more modules of computer instructions coded on a computer-readable medium so that the data processing means could perform or control its operations. The computer-readable medium may be a machine readable storage device, a machine readable storage chip, a memory device, synthetic material influencing machine readable transmitted signals or one or more combinations thereof. The term "data processing means" comprises all means, devices and machines for data processing, for example comprising programmable processor, computer, a plurality of processors or computers. In addition to hardware, the means may include codes for creating the execution environment of computer programs discussed, for example constituting firmware of processor, protocol stack, database management system and operation system or codes for constituting one or more combinations thereof. Transmitted signal may be an artificial signal, such as a electrical, optical or electromagnetic signal generated by machines, which is generated to encode messages so as to be transmitted to an appropriate receiver means.

The computer program (also referred to as program, software, software application, script or code) may be written in any programming language including compiler or interpreted language, and also may be arranged in any form including independent program or module, component, subprogram or other unit adapted to be used in a computer environment. It may not be necessary for the computer program to be corresponding to documents in the document system. The program may be stored in a part of the document of other program or data (e.g. one or more scripts stored in markup language documents), a single document dedicated to the discussed program, or a plurality of collaborative documents (e.g. documents storing one or more modules, subprograms or code parts). The computer program could be arranged to be performed on a computer or a plurality of computers located in one position or distributed among many locations and interconnected via communication net.

The processes and logical flows described in the Specification can be carried out by one or more of the programmable processor which performs one or more computer programs to operate the input data and generate outputs to perform functions. The processes and logical flows can also be carried out by logic circuits with special functions, such as FPGA (field programmable gate array) and ASIC (application-specific integrated circuit), and devices can also be carried out by the logic circuits with special functions.

As an example, a processor suitable for execution of computer programs includes microprocessors for general and special purpose, and any one or more of processors of any type of digital computers. Generally, the processor receives instructions and data from read-only memory or random access memory or both. A basic element of a computer is a process for executing instructions and one or more storage devices for storing instructions and data. Generally, the computer also includes one or more mass storage devices, such as magnetic or optical disks, for storing instructions and data, operatively coupled to one or more mass storage for receiving date therefrom or transmitting data thereto, or both. However, the computer does not need to have such devices. Computer readable medium suitable for storing computer program instructions and data includes all types of nonvolatile memory, media and storage devices, for example, including: semiconductor storage device, such as EPROM, EEPROM and flash memory devices; magnetic disk, such as internal hard disk or mobile hard disk: magnetic or optical disk; and CD-ROM and DVD-ROM. Special purpose logic circuits can be supplemented or combined into the processor and memory.

In order to provide the interaction with users, the disclosed embodiments can be implemented on a computer, which comprises a display device such as a CRT (cathode ray tube) or LCD (liquid crystal display) monitor and a keyboard and a pointing device such as a mouse or trackball, with which the user can provide input to the computer. Other types of devices can be used to provide the interaction with the user. For example, a feedback provided to the user can be any form of a sensitive feedback, such as visual feedback, audio feedback or tactile feedback, and the input from the user can be received in any form, including sound, voice, or touch input.

The disclosed embodiments be implemented on a computing system including a back-end component such as a data server, or a middle component such as an application server component, or a front-end component such as a client computer component, or any combination of one or more of the back-end component, the middle component, and the front-end component, the client computer has a graphical user interface (GUI) or a Web browser, through which users can interact with the disclosed embodiments. The components of the system can be interconnected through any or digital data communication medium of the communication network. Examples of the communication network include a local area network (LAN) and a wide area network (WAN), such as the Internet.

The system for implementing the disclosed embodiment can include a client computer (client) and a server computer (server). The client and the server normally are away from each other and typically interact with each other through a communication network. The relationship between the client and the server can be occurred by computer programs running on their respective computer and having a client-server relationship with each other.

Although the specification includes many specific content, but this content does not constitute any restriction to the present inventions or required scope, but is used as a specific example of the description of the specific features. In this Specification, a feature described under the context of one embodiment can be implemented in a combined manner in one embodiment. On the contrary, a feature described under the context of one embodiment can be implemented separately or in any appropriate combination in multiple embodiments. In addition, features can be described to function in combinations, even in the original requirement, but in some situations, one or more features from a required combination can be removed from the combination, and the required combination can be aimed to a sub-combination or the variation of the sub-combination.

Similarly, while operations, in figures, are illustrated in a specific order, but this should not be understood as requiring the illustrated operations to be performed in a particular order or a continuous order to achieve the desired results. In some cases, multitasking and parallel processing is advantageous. In addition, the separation of the system components in the disclosed embodiments should not be understood as requiring making such separation in all embodiments. The described program component and system can be integrated together or enclosed into more than one soft product.

Although the specific embodiments have been described, other embodiments remain within the scope of appended claims.

Although the preferred embodiments of the present invention have been described, many modifications and changes may be possible once those skilled in the art get to know some basic inventive concepts. The appended claims are intended to be construed comprising these preferred embodiments and all the changes and modifications fallen within the scope of the present invention.

It will be apparent to those skilled in the art that various modifications and variations could be made to the present application without departing from the spirit and scope of the present invention. Thus, if any modifications and variations lie within the spirit and principle of the present application, the present invention is intended to include these modifications and variations.

What is claimed is:

1. A non-locality-based super-resolution reconstruction method on a super-resolution reconstruction image system comprising a processor, the method comprising:
    performing, using the processor, an interpolation on a plurality of image frames to be reconstructed, and dividing each of the image frames into a plurality of macroblock with a same size;
    determining, using the processor, for each macro-block in each of the image frames, a position of a search window where a current macro-block is mapped in each of other image frames;
    determining, using the processor, a pixel block corresponding to each pixel in a circle formed by taking the each pixel on each of the image frames as a center of the circle and a predetermined distance as a radius of the circle;
    performing, using the processor and in the each of the image frames, following operations on each determined pixel block therein:
        determining a search window where the current pixel block is mapped in the each of the image frames, according to the position of the search window where the macro-block, where the pixel corresponding to the current pixel block is located, is mapped in the each of the image frames, and
        determining a similarity value of each determined pixel block in the determined search window relative to the current pixel block respectively; and
    determining, using the processor, an optimized central pixel value of each pixel block according to the determined similarity value.

2. The method of claim 1, wherein the step of determining a position of a search window where a current macro-block is mapped in each of other image frames further comprises:
    determining a motion vector from the current macro-block to the each of the other image frames respectively;
    with respect to an image frame, using the determined motion vector as the motion vector of the search widow where the current macro-block is mapped in the image frame, and then re-locating the position of the search window.

3. The method of claim 2, wherein the motion vector from the current macro-block to the each of the other image frames is determined by rule of:

$$A_1 = \sum_{i=m+1}^{n} A_i (n > m);$$

$$A_2 = \sum_{j=x}^{m-1} A_j (x < m),$$

where the current macro-block is in m-th image frame; $A_1$ is the motion vector from the current macro-block to n-th image frame; $A_i$ is the motion vector from the macro-block in (i−1)-th image frame corresponding to the current macro-block to i-th image frame; $A_2$ is the motion vector from the current macro-block to x-th image frame; and $A_j$ is the motion vector from the macro-block in (j+1)-th image frame corresponding to the current macro-block to j-th image frame.

4. The method of claim 3, wherein
$A_i$ is obtained by determining an initial predicted vector of the macro-block in the (i−1)-th image frame corresponding to the current macro-block, and performing adaptive rood mode search in accordance with the determined initial predicted vector; and
$A_j$ is obtained by determining an initial predicted vector of the macro-block in the (j+1)-th image frame corresponding to the current macro-block, and performing the adaptive rood mode search in accordance with the determined initial predicted vector.

5. The method of claim 4, wherein,
the step of determining an initial predicted vector of the macro-block in the (i−1)-th image frame corresponding to the current macro-block further comprises:
if the (i−1)-th image frame is an image where the current macro-block is located and the current macro-block is located at the leftmost, the initial predicted vector of the macro-block is zero;
if the (i−1)-th image frame is an image where the current macro-block is located and the current macro-block is not located at the leftmost, a motion vector of a left adjacent macro-block is used as the initial predicted vector of the macro-block; and
if the (i−1)-th image frame is not an image where the current macro-block is located, a motion vector of the macro-block in a previous image frame is used as the initial predicted vector of the macro-block;
the step of determining, in the (j+1)-th image frame, an initial predicted vector of the current macro-block in the (j+1)-th image frame corresponding to the current macro-block further comprises:
if the (j+1)-th image frame is an image where the current macro-block is located and the current macro-block is located at the leftmost, the initial predicted vector of the macro-block is zero;

if the (j+1)-th image frame is an image where the current macro-block is located and the current macro-block is not located at the leftmost, a motion vector of a left adjacent macro-block is used as the initial predicted vector of the macro-block; and if the (j+1)-image frame is not an image where the current macro-block is located, a motion vector of the macro-block in a subsequent image frame is used as the initial predicted vector of the macro-block.

6. The method of claim 1, wherein the step of determining a similarity value further comprises:

determining a local structure descriptor and a local luminance descriptor of the each pixel block in the current pixel block and the search window;

determining a normalized total similarity value based on the determined local structure descriptor and the determined local luminance descriptor; and determining the similarity value between the current pixel block and the each pixel block in the search window based on the determined local structure descriptor and the determined local luminance descriptor and the normalized total similarity value.

7. The method of claim 6, wherein the normalized total similarity value is determined by rule of:

$$C(k, l) = \sum_{i,j \in N(k,l)} \exp\left\{-\frac{\|P(i, j, r) - P(k, l, r)\|_2^2}{\sigma_1^2}\right\} \times \exp\left\{-\frac{\|I(i, j, r) - I(k, l, r)\|_2^2}{\sigma_2^2}\right\};$$

and the similarity value is determined in accordance with:

$$W(k, l, i, j) = \frac{1}{C(k, l)} \times \exp\left\{-\frac{\|P(i, j, r) - P(k, l, r)\|_2^2}{\sigma_1^2}\right\} \times \exp\left\{-\frac{\|I(i, j, r) - I(k, l, r)\|_2^2}{\sigma_2^2}\right\}$$

where C(k, l) is the normalized total similarity value; W(k, l, i, j) is the similarity value between the pixel block corresponding to the pixel (k, l) and the pixel block corresponding to the pixel (i, j); k is a x-coordinate of the pixel corresponding to the current pixel block; l is a y-coordinate of the pixel corresponding to the current pixel block; j is a y-coordinate of the pixel corresponding to another pixel block; r is the radius; P(k, l, r) is the local structure descriptor of the current pixel block; I(i, j, r) is the local luminance descriptor of another pixel block; I(k, l, r) is the local luminance descriptor of the current pixel block; $\sigma_1$ is a corresponding weight of the local structure descriptor and $\sigma_2$ is a corresponding weight of the local luminance descriptor; N(k, l) is a neighborhood of (k, l), the neighborhood comprises all the search windows in every frame corresponding to (k, l).

8. The method of claim 7, wherein the corresponding weight of the local structure descriptor is determined by rule of:

$$\sigma_1 = \sigma_0 + \text{step} \times \left[\frac{\min_{i,j \in N(k,l)} \{\|P(i, j, r) - P(k, l, r)\|_2^2\}}{L}\right]$$

where $\sigma_0$ is the initial value of $\sigma_1$, L is a length of piecewise function.

9. The method of claim 1, wherein the step of determining an optimized central pixel value further comprises:

using, for any pixel block, the similarity value between the current pixel block and the each pixel block as a weight, and determining a weighted average of central pixel values in the each pixel block to obtain an optimized central pixel value of the current pixel block.

10. A non-locality-based super-resolution reconstruction device, comprising:

a memory that stores executable components; and a processor, coupled to the memory, that executes the executable components to perform operations of the device, the executable components comprising:

a first processing module configured to perform an interpolation process on a plurality of image frames to be reconstructed, and dividing each of the image frames into a plurality of macroblocks with a same size;

a position determining module configured to determine, for each macro-block in the each of the image frames, a position of a search window where a current macro-block is mapped in each of other image frames;

a second processing module configured to determine a pixel block corresponding to each pixel in a circle formed by taking the each pixel on the each of the image frames as a center of the circle and a predetermined distance as a radius of the circle;

a similarity determining module configured to perform, in the each of the image frames, following operations on each determined pixel block therein:

determining a search window where the current pixel block is mapped in the each of the image frames, according to the position of the search window where the macro-block, where the pixel corresponding to the current pixel block is located, is mapped in the each of the image frames, and determining a similarity value of each determined pixel block in the determined search window relative to the current pixel block respectively;

a pixel value determining module configured to determine an optimized central pixel value of each pixel block according to the determined similarity value.

11. The device of claim 10, wherein the position determining module is further configured to:

determine a motion vector from the current macro-block to the each of the other image frames respectively;

with respect to an image frame, use the determined motion vector as the motion vector of the search widow where the current macro-block is mapped in the image frame, and then re-locating the position of the search window.

12. The device of claim 11, wherein the position determining module determines the motion vector from the current macro-block to the each of the other image frames by rule of:

$$A_1 = \sum_{i=m+1}^{n} A_i (n > m);$$

-continued $$A_2 = \sum_{j=x}^{m-1} A_j (x < m),$$

where the current macro-block is in m-th image frame; $A_1$ is the motion vector from the current macro-block to n-th image frame; $A_i$ is the motion vector from the macro-block in (i−1)-th image frame corresponding to the current macro-block to i-th image frame; $A_2$ is the motion vector from the current macro-block to x-th image frame; and $A_j$ is the motion vector from the macro-block in (j+1)-th image frame corresponding to the current macro-block to j-th image frame.

13. The device of claim 12, wherein the position determining module is further configured to:
    determine an initial predicted vector of the macro-block in the (i−1)-th image frame corresponding to the current macro-block, and perform adaptive rood mode search to obtain $A_i$ in accordance with the determined initial predicted vector; and
    determine an initial predicted vector of the macro-block in the (j+1)-th image frame corresponding to the current macro-block, and perform the adaptive rood mode search to obtain $A_j$ in accordance with the determined initial predicted vector.

14. The device of claim 13, wherein the position determining module is further configured to:
    set the initial predicted vector of the macro-block to be zero if the (i−1)-th image frame is an image where the current macro-block is located and the current macro-block is located at the leftmost;
    set a motion vector of a left adjacent macro-block to be used as the initial predicted vector of the macro-block if the (i−1)-th image frame is an image where the current macro-block is located and the current macro-block is not located at the leftmost;
    set a motion vector of the macro-block in a previous image frame to be used as the initial predicted vector of the macro-block if the (i−1)-th image frame is not an image where the current macro-block is located;
    set the initial predicted vector of the macro-block to be zero if the (j+1)-th image frame is an image where the current macro-block is located and the current macro-block is located at the leftmost;
    set a motion vector of a left adjacent macro-block to be used as the initial predicted vector of the macro-block if the (j+1)-th image frame is an image where the current macro-block is located and the current macro-block is not located at the leftmost; and
    set a motion vector of the macro-block in a subsequent image frame to be used as the initial predicted vector of the macro-block if the (j+1)-th image frame is not an image where the current macro-block is located.

15. The device of claim 10, wherein the similarity determining module is further configured to:
    determine a local structure descriptor and a local luminance descriptor of the each pixel block in the current pixel block and the search window;
    determine a normalized total similarity value based on the determined local structure descriptor and the determined local luminance descriptor; and
    determine the similarity value between the current pixel block and the each pixel block in the search window based on the determined local structure descriptor and the determined local luminance descriptor and the normalized total similarity value respectively.

16. The device of claim 10, wherein the pixel value determining module is further configured to:
    use, for any pixel block, the similarity value between the current pixel block and the each pixel block as a weight, and
    determine a weighted average of central pixel values in the each pixel block to obtain an optimized central pixel value of the current pixel block.

17. The device of claim 11, wherein the pixel value determining module is further configured to:
    use, for any pixel block, the similarity value between the current pixel block and the each pixel block as a weight, and
    determine a weighted average of central pixel values in the each pixel block to obtain an optimized central pixel value of the current pixel block.

18. The device of claim 12, wherein the pixel value determining module is further configured to:
    use, for any pixel block, the similarity value between the current pixel block and the each pixel block as a weight, and
    determine a weighted average of central pixel values in the each pixel block to obtain an optimized central pixel value of the current pixel block.

19. The device of claim 13, wherein the pixel value determining module is further configured to:
    use, for any pixel block, the similarity value between the current pixel block and the each pixel block as a weight, and
    determine a weighted average of central pixel values in the each pixel block to obtain an optimized central pixel value of the current pixel block.

20. The device of claim 14, wherein the pixel value determining module is further configured to:
    use, for any pixel block, the similarity value between the current pixel block and the each pixel block as a weight, and
    determine a weighted average of central pixel values in the each pixel block to obtain an optimized central pixel value of the current pixel block.

* * * * *